(12) United States Patent
Rebstock (10) Patent No.: US 7,977,556 B2
(45) Date of Patent: Jul. 12, 2011

(54) MUSIC NOTATION SYSTEM

(76) Inventor: Matthew Rebstock, Redondo Beach, CA (US)

( * ) Notice: Subject to any disclaimer, the term of this patent is extended or adjusted under 35 U.S.C. 154(b) by 0 days.

(21) Appl. No.: 12/783,811

(22) Filed: May 20, 2010

(65) Prior Publication Data

US 2010/0242708 A1     Sep. 30, 2010

Related U.S. Application Data

(62) Division of application No. 12/250,098, filed on Oct. 13, 2008, now Pat. No. 7,750,225.

(51) Int. Cl.
*G09B 15/02* (2006.01)

(52) U.S. Cl. .................. 84/313; 84/471 R; 84/477 R (58) Field of Classification Search ................. 84/483.2, 84/471 R, 477 R
See application file for complete search history.

(56) References Cited

U.S. PATENT DOCUMENTS

| 2,028,809 A | 1/1936 | Shannon | |
| 6,831,219 B1 * | 12/2004 | Bonham | 84/483.2 |

* cited by examiner

*Primary Examiner* — Jianchun Qin
(74) *Attorney, Agent, or Firm* — Seth D. Levy; Davis Wright Tremaine LLP

(57) ABSTRACT

The invention relates to a music notation system that obviates the need for one to have any knowledge of conventional music notation in order to play a keyboard, including those that are a component of a conventional musical instrument, those that are a component of an electronic musical instrument and those that are configured as a user interface with a computer system and/or video game.

10 Claims, 6 Drawing Sheets

MUSIC NOTATION SYSTEM

CROSS-REFERENCE TO RELATED APPLICATIONS

This application is a divisional of U.S. patent application Ser. No. 12/250,098, filed Oct. 13, 2008, issued as U.S. Pat. No. 7,750,225 on Jul. 6, 2010, which is incorporated by reference herein in its entirety.

FIELD OF THE INVENTION

The invention relates to the field of music; specifically, to a system for displaying or presenting written music.

BACKGROUND OF THE INVENTION

Music notation has existed in various forms for thousands of years. Modern music notation systems use one or more staves and written symbols in order to designate the playing notes on an instrument. Pitch is represented vertically on the staff, with higher pitches placed higher on the staff on or in between staff lines. Time, meanwhile, is represented horizontally on the musical staff, with left-to-right representing its passage. A staff typically features a clef that indicates the particular range of pitches encompassed by the staff. Key signatures are also placed at the beginning of a staff and serve to designate the key of the piece by specifying certain notes to be held flat or sharp throughout the piece, unless otherwise indicated. Within this framework, throughout the musical staff appear the notes that are played by the instrumentalist. The notes' location on the staff (relative to a given line or lines) indicates the notes' pitch. The shape of the note and its flag indicate the length of the note and duration between two notes. Chords, or multiple notes played at the same time, are designated by notes placed vertically over one another. Also, special symbols are provided for rests of various lengths.

Among other things, the complexity of this conventional music notation system has confounded students for years. It can be difficult to learn and equally challenging to teach. As a result, students often give up a pursuit of mastering an instrument, based on their frustration with this complicated system for reading and presenting music. Similar challenges confront composers who find it difficult to work within this system.

A number of systems have been developed to improve and simplify musical notation, but none has successfully disclosed a functioning music notation system that has substantially improved upon the current conventional system, while simultaneously greatly simplifying music pedagogy. In order to address this and other issues, there remains a long felt need in the art for a simplified music notation system that greatly simplifies music pedagogy such that novice students may quickly and easily begin reading music.

BRIEF SUMMARY OF THE INVENTION

In an embodiment, the invention includes a music notation system, comprising a horizontal line; one or more notes depicted above the horizontal line to be played with a left hand on a keyboard; and one or more notes depicted below the horizontal line to be played with a right hand on a keyboard. The notes may be represented by letters, numbers or combinations thereof, and symbols may be used in combination with the letters, numbers or combinations thereof to denote sharp and flat notes. Notes depicted immediately next to one another may be to be played as a sequence of notes, and notes depicted with commas therebetween may be to be played together as chords. The system may comprise a series of individual music segments, and one or more of the individual music segments in the series of individual music segments may be written once but intended to be played more than once. The system may comprise octave symbols, and may comprise an octave notation to signify a choice of octaves. The octave notation may signify a choice of octaves wherein the one or more notes depicted above the horizontal line to be played with the left hand are in the octave that is two below middle C, and the one or more notes depicted below the horizontal line to be played with the right hand are in the octave that is one below middle C. The system may comprise at least one additional horizontal line to depict corresponding additional octaves.

In another embodiment, the invention includes a music notation system, comprising: at least one arrow with an individual cluster of notes depicted about it, wherein each individual cluster of notes is to be played in succession, wherein notes above the arrow are to be played in an ascending order, and wherein notes below the arrow are to be played in a descending order. The system may further comprise at least one horizontal line with a sustained note or chord depicted with it, wherein the sustained note or chord is sustained as the music notation system is read from left to right relative to the at least one arrow with the individual cluster of notes depicted about it, and the sustained note or chord is not played during such time as the horizontal line with which it is depicted does not appear. The individual cluster of notes and the sustained note or chord may each be represented by letters, numbers or combinations thereof, and symbols may be used in combination with the letters, numbers or combinations thereof to denote sharp and flat notes. The system may comprise octave symbols.

In another embodiment, the invention includes an application comprising a music notation system, the system comprising a horizontal line; one or more notes depicted above the horizontal line to be played with a left hand on a keyboard; and one or more notes depicted below the horizontal line to be played with a right hand on a keyboard, and wherein the application is selected from the group consisting of sheet music, an annotation to conventional sheet music, a video game, a music instruction tools, a music instruction publication, a MIDI software, a music composition software, a math game, and combinations thereof. The application may be configured for use with a computer keyboard or telephone keypad.

In another embodiment, the invention includes a music notation system, comprising: at least one arrow with an individual cluster of notes depicted about it, wherein each individual cluster of notes is to be played in succession, wherein notes above the arrow are to be played in an ascending order, and wherein notes below the arrow are to be played in a descending order, and wherein the application is selected from the group consisting of sheet music, an annotation to conventional sheet music, a video game, a music instruction tools, a music instruction publication, a MIDI software, a music composition software, a math game, and combinations thereof. The application may be configured for use with a computer keyboard or telephone keypad.

BRIEF DESCRIPTION OF THE DRAWINGS

Exemplary embodiments are illustrated in referenced figures, where like numerals represent similar items. It is intended that the embodiments and figures disclosed herein are to be considered illustrative rather than restrictive.

DETAILED DESCRIPTION

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

One skilled in the art will recognize many methods and materials similar or equivalent to those described herein, which could be used in the practice of the present invention. Indeed, the present invention is in no way limited to the methods and materials described.

References herein to a "keyboard" include any keyboard, including those that are a component of a conventional musical instrument, those that are a component of an electronic musical instrument and those that are configured as a user interface with a computer system (e.g., for use with a musical instrument digital interface system or "MIDI") and/or video game.

References herein to an "instrumentalist" refer to one who plays music depicted with the music notation system of the instant invention, regardless of the instrument, computer system, video game or other system used to play the music.

The invention is based on a musical notation system and methods that allow for accelerated learning and provide a theory of understanding and communicating musical ideas on instruments and devices that include one or more keyboards. In those embodiments of the invention in which the system is designed for sight reading, two staves may be used to illustrate written music (a two-stave depiction is similar to conventional piano sheet music), while in other embodiments of the invention any number of staves may be used, as further described herein.

The invention has numerous benefits over the prior art. These include, but are in no way limited to, enabling those without formal musical training to play music and to read, write, arrange and publish original compositions on piano and MIDI instruments. Additional benefits of the present invention include: enabling publishers to create catalogs of piano work that are useable by those who cannot read conventional music; transcribing guitar tabulature and conventional written music to piano/MIDI notation; providing a tool for music teachers to use in accelerating the music learning process and communicating musical ideas/arrangements on instruments with keyboards; enabling those with learning disabilities to play and read music; and providing an improved system for composers/musicians that has particular application in using MIDI instruments and/or multiple instruments in a single piece.

Figure 1A:
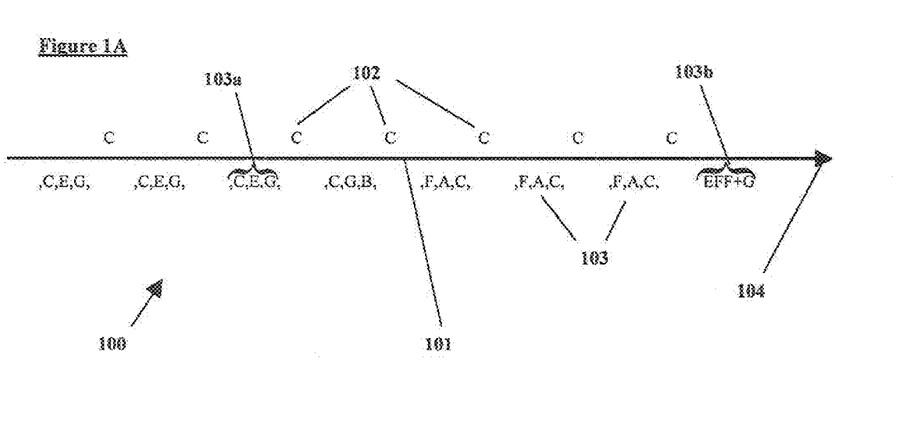
FIG. 1A depicts a music notation system illustrating the first portion of the song Imagine, by John Lennon, in accordance with an embodiment of the present invention.

As illustrated in FIG. 1A, in one embodiment of the instant invention, a music notation system 100 is based on a representation of musical notes in which a horizontal line 101 separates notes that are depicted in letter form (i.e., A through G). In an embodiment of the instant invention the notes are to be played on a keyboard; the left hand notes 102 (i.e., those notes that would typically be played by the left hand on a keyboard) are written above the horizontal line 101, and the right hand notes 103 (i.e., those notes that would typically be played by the right hand on a keyboard) are written below the horizontal line 101. The music notation system 100 is read in the direction of the arrow 104 at the end of the horizontal line 101, which is illustratively depicted as being from left to right in FIG. 1A (i.e., because the arrow 104 points to the right, and would be the opposite if the arrow instead (not shown) appeared on the left side of the horizontal line 101 and pointed to the left).

Single letters represent single notes. For instance, each letter "C" illustratively depicted above the horizontal line 101 in FIG. 1A represents a single "C." The inclusion of a "+" or "#" sign following a letter indicates that the letter should be played as a sharp, while the inclusion of a "−" or "b" sign following a letter indicates that the letter should be played as a flat. For instance, "A+" or "A#" would indicate "A sharp," while "A−" or "Ab" would indicate "A flat."

Multiple letters written together and separated from one another with commas represent chords. In addition, letters written together and separated from one another with commas to represent chords may also be surrounded by commas. For instance, the cluster of letters and commas at 103a represents a C major chord (i.e., with the notes "C," "E" and "G" together) to be played with the right hand (because it appears below the horizontal line 101). Multiple letters written together but neither surrounded by nor separated from one another with commas represent single notes to be played in sequence, reading from left to right. For instance, the cluster of letters and symbols at 103b represents the sequence of notes (1) "E," (2) "F," (3) "F sharp" and (4) "G" to be played in order—(1) to (4)—with the right hand (because it appears below the horizontal line 101).

In an alternate embodiment of the instant invention, numbers may partially or entirely replace the letters that would otherwise be used to represent notes on a keyboard. In such an embodiment, the fingers on each hand are numbered 1 through 5, beginning with the thumb (although in a further embodiment, numbering may instead begin with the pinky). Then, a framework is selected such that the numbers equate to letters on the keyboard. So, by way of example, the notes C through G may equate to the numbers 1 through 5 on the right hand. When this framework is being utilized (e.g., in connection with music instruction), the letters used herein may be replaced partially or entirely with numbers (not shown). The sharp and flat symbols described above may be used with the numbers, too.

Figure 1B:
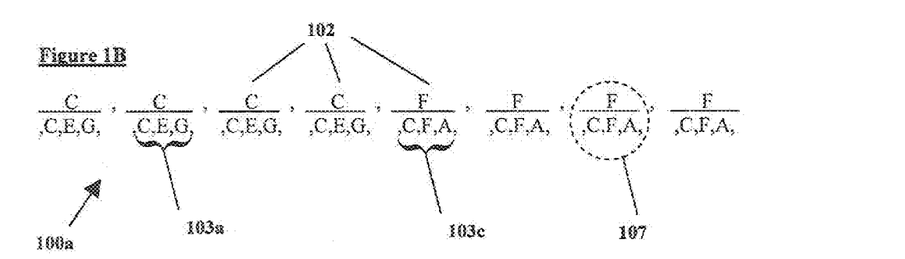
FIG. 1B depicts a simplified version of a music notation system in accordance with an embodiment of the present invention.

An alternate embodiment of the instant invention includes a simplified music notation system 100a, based in part upon the aforementioned music notation system 100. As depicted in FIG. 1B, the simplified music notation system 100a includes individual music segments 107 that may be separated from one another by a comma or other punctuation mark. Each individual music segment 107 includes a short horizontal line 101a, which separates the right and left hand notes as in the music notation system 100 described above. However, in the simplified music notation system 100a, each individual music segment 107 represents one pairing of right and left hand notes that an instrumentalist plays on a keyboard by toggling back and forth between right and left hands, typically beginning with the right hand. This can be an especially convenient device with which to depict accompanyments for simple popular music. In the embodiment illustrated in FIG. 1B, the simplified music notation system 100a includes a series of four C major chords in the right hand, each followed by a single C note in the left hand, then a series of four F major chords, second inversion, each followed by a single F note in the left hand.

Figure 1C:
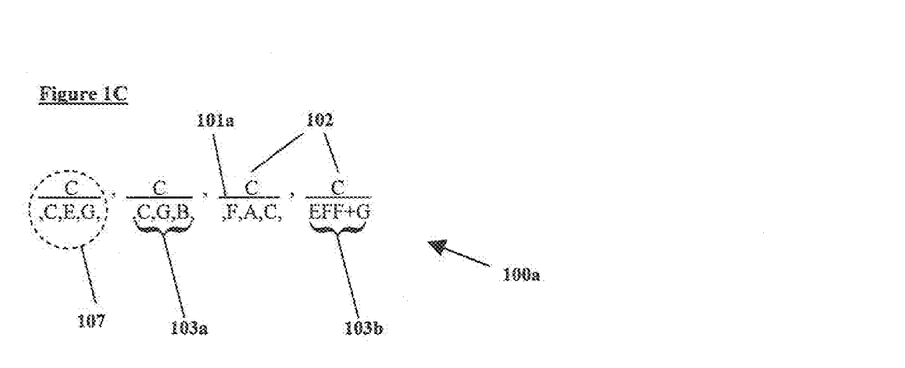
FIG. 1C depicts a simplified version of a music notation system illustrating the same first portion of the song Imagine, by John Lennon, as depicted in FIG. 1A, in accordance with an embodiment of the present invention.

Rather than depicting the same chords multiple times in a row, FIG. 1C illustrates an efficient variation on the simplified music notation system 100a in which individual music segments 107 intended to be played multiple times are only depicted once. The instrumentalist playing the notes must appreciate when to change to the next individual music segment. Thus, the simplified music notation system 100a depicted in FIG. 1C illustrates the identical music passage as depicted in FIG. 1A.

In an alternate embodiment of the instant invention, an instrumentalist may deviate from that which is depicted in the music notation system 100 or simplified version thereof 100a. For example, the instrumentalist may play a single note (e.g., one of the single "C" notes at 102) as an octave pair of notes (e.g., a pair of "C's") with the left hand, to enhance or alter the musical effect. Other similar deviations will be readily understood by those of skill in the art, may be implemented with exercise of routine skill and are considered as being within the scope of the instant invention.

In the embodiments of the present invention discussed thus exact timing (i.e., duration of notes relative to real time) is not formally notated in the music notation system. Instead, timing is interpreted by the instrumentalist. This can be done based on familiarty with the music, the instrumentalist's interpretation of the piece being played, or any other of a number of factors as will be readily appreciated by those of skill in the art. The music notation system of the invention provides points of reference that allow an instrumentalist to relate timing visually by observing spatial relationships of notes and chords on one stave to the notes and chords on the other stave. This becomes more apparent in further embodiments described herein.

The music notation system of the instant invention includes a system of octave symbols for depicting the octave within which each note is to be played. In the absence of any octave symbol, as illustrated for example in FIG. 1A, the left hand notes 102 above the horizontal line 101 are to be played in the octave that is two to the left of "middle C" (i.e., key No. 40 on a conventional 88-key keyboard), and the right hand notes 103 below the horizontal line 101 are to be played in the octave that is one to the left of "middle C." A notation may be included with the music to signify the aforementioned choice of octaves, as follows, with or without the use of brackets around it:

$$\left\{ \frac{(-2)C}{(-1)C} \right\}$$

As should be readily apparent, changing the number(s) in the above notation can orient an instrumentalist to play the music in a different set of octaves.

Moreover, the default scenario for the various music notation systems of the present invention is that the right and left hand notes are played such that the notes illustrated for the two hands fit conveniently next to one another; that is, the two hands are not meant to be played with "extra" octaves between them, or, conversely, in a manner wherein the notes played by the two hands overlap with one another. If either of those scenarios is intended, then octave symbols (described in greater detail below) may be used.

Figure 2:
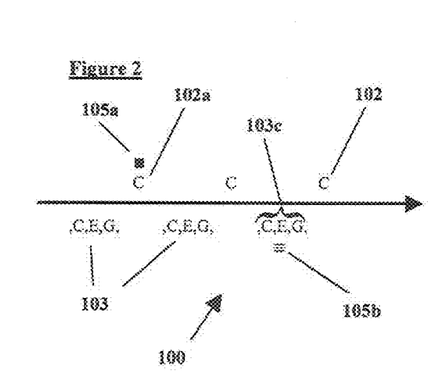
FIG. 2 depicts the use of octave symbols in connection with a music notation system, in accordance with an embodiment of the present invention.

Table 1 includes a series of octave symbols that are used in connection with various embodiments of the present invention. FIG. 2 illustratively depicts the use of octave symbols 105 with individual notes. The octave symbols 105 may be placed above or below the note(s) to which they relate. In the music depicted in FIG. 2, it is first assumed that the left hand notes 102 are to be played in the octave that is two to the left of "middle C," and the right hand notes 103 are to be played in the octave that is one to the left of "middle C." The left hand notes 102 depicted in FIG. 2 are a series of three "C's," but the first of these three "C's" 102a includes an octave symbol 105a that requires that this particular "C" is played in the octave that is three to the left of "middle C." Similarly, the right hand notes 103 depicted in FIG. 2 are a series of three C major chords (i.e., "C," "E" and "G" played together), but the third of these three C major chords 103c includes an octave symbol 105b that requires that this particular chord is played in the octave that is three to the right of the octave including "middle C."

TABLE 1

Octave Symbols

| Symbol | Explanation** |
|---|---|
| □ | The octave four to the left of "middle C" (i.e., key Nos. 1-3) |
| ■ | The octave three to the left of "middle C" (i.e., key Nos. 4-15) |
| ● | The octave two to the left of "middle C" (i.e., key Nos. 16-27) |
| · | The octave one to the left of "middle C" (i.e., key Nos. 28-39) |
| : | Notation* indicating that the notes above the horizontal line are in the octave that is two to the left of "middle C" and that the notes below the horizontal line are in the octave that is one to the left of "middle C" |
| . | The octave that includes "middle C" (i.e., key Nos. 40-51) |
| − | The octave one to the right of the octave including "middle C" (i.e., key Nos. 52-63) |
| = | The octave two to the right of the octave including "middle C" (i.e., key Nos. 64-75) |

TABLE 1-continued

Octave Symbols

| Symbol | Explanation** |
|---|---|
| ≡ | The octave three to the right of the octave including "middle C" (i.e., key Nos. 76-87) |
| ≣ | The octave four to the right of the octave including "middle C" (i.e., key No. 88) |

*In the absence of any octave notation in the music notation system, this configuration is implied.
**Key Nos. are based on a conventional 88-key keyboard.

An alternative series of symbols may be used to accomplish the same result with regard to octave notation; that is, to provide a unique identifier for each octave relative to "middle C." In yet another embodiment of the instant invention, the octave notation may be adapted such that, rather than being relative to "middle C," it is relative to another note. Or, the octave notation may be adapted such that the lowest octave is three (not four) to the left of "middle C," because it includes key Nos. 1-8 (rather than only key Nos. 1-3 as illustrated in Table 1), and so on.

Figure 3:
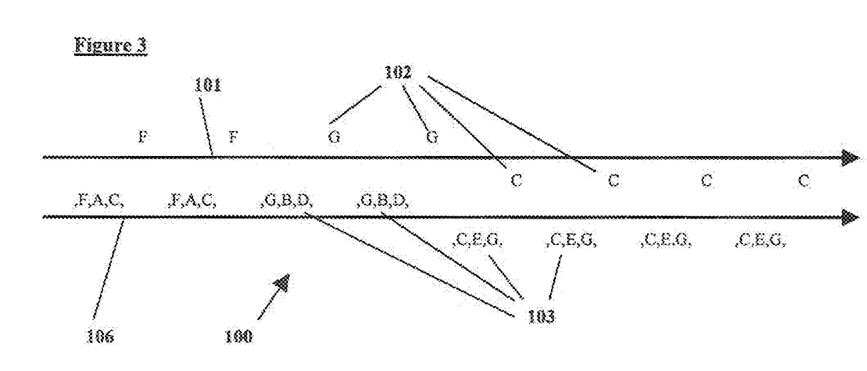
FIG. 3 depicts a music notation system illustrating the latter portion of the chorus from the song Imagine by John Lennon, including a second horizontal line, in accordance with an embodiment of the present invention.

As illustrated in FIG. 3, the music notation system 100 may include at least one additional horizontal line 106 below the primary horizontal line 104. The additional horizontal line 106 provides a convenient mechanism to depict an additional octave. In the music depicted in FIG. 3, it is again first assumed that the left hand notes 102 relative to the primary horizontal line 104 are to be played in the octave that is two to the left of "middle C," and the right hand notes 103 relative to the primary horizontal line 104 are to be played in the octave that is one to the left of "middle C." Thus, the first half of the music illustrated in FIG. 3 includes a series of two F major chords (i.e., "F," "A" and "C" played together) in the right hand played in the octave that is one to the left of "middle C," each followed by a single F in the left hand played in the octave that is two to the left of "middle C," and then a series of two G major chords (i.e., "B" and "D" played together) in the right hand again played in the octave that is one to the left of "middle C," each followed by a single G in the left hand again played in the octave that is two to the left of "middle C." In the second half of the music illustrated in FIG. 3, the right hand notes 103 and left hand notes 102 are written relative to the additional horizontal line 106. The additional horizontal line 106 is a single octave above the primary horizontal line 104. Therefore, the second half of the music illustrated in FIG. 3 includes a series of four C major chords in the right hand played in the octave that includes "middle C," each followed by a single C in the left hand played in the octave that is one to the left of "middle C."

Figure 4:
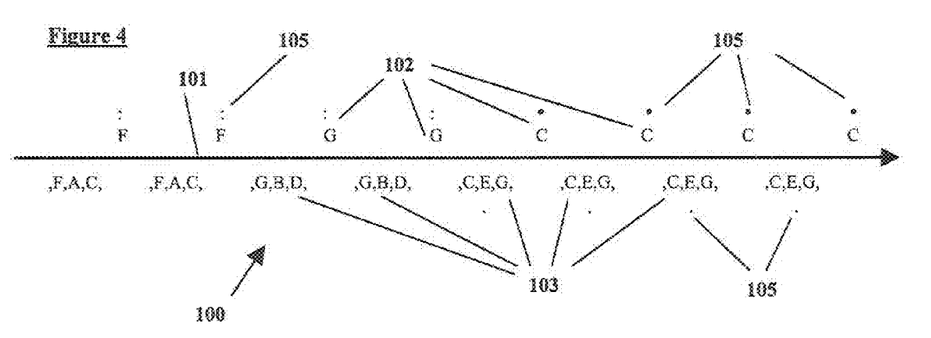
FIG. 4 depicts the music notation system illustrating the identical portion of the chorus from the song Imagine by John Lennon as is depicted in FIG. 3, using octave notations.

Alternatively, FIG. 4 illustrates the identical music as that which is illustrated in FIG. 3, except that FIG. 4 employs the aforementioned octave notation 105 with the left hand notes 102 and right hand notes 103 about a single horizontal line 101, rather than shifting the notes down and utilizing an additional horizontal line. Thus, the first half of the music illustrated in FIG. 4 includes the assumed ":" octave notation 105, to denote that the music is to be played with the left hand notes 102 in the octave that is two to the left of "middle C," and the right hand notes 103 in the octave that is one to the left of "middle C." In the second half of the music, the "C" major chords in the right hand notes 103 include the "." octave notation 105, indicating that the chords are to be played in the octave that includes "middle C," and the left hand notes 102 include the "•" octave notation 105, indicating that the notes are to be played in the octave one to the left of "middle C."

In another embodiment of the instant invention, the music notation system is configured to depict an infinite number of separate lines (staves) of music. This may be especially advantageous for those embodiments where the music is to be played by multiple instruments simultaneously; for instance, in connection with a piece composed for a band or orchestra (although any combination of instruments, small or large, may be suitable for use in connection with these embodiments). Alternatively or in addition, the use of multiple separate lines of music may be useful where a MIDI or other computer system is utilized to simulate the sound of multiple instruments. Those of routine skill in the art will appreciate still further uses for such an embodiment of the instant invention.

Several additional music notation constructs may be utilized in these embodiments of the instant invention.

Figure 5A:
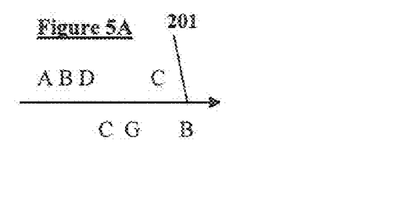
FIG. 5A depicts a music notation system illustrating individual notes played in a sequence, in accordance with an embodiment of the present invention.
Figure 5B:
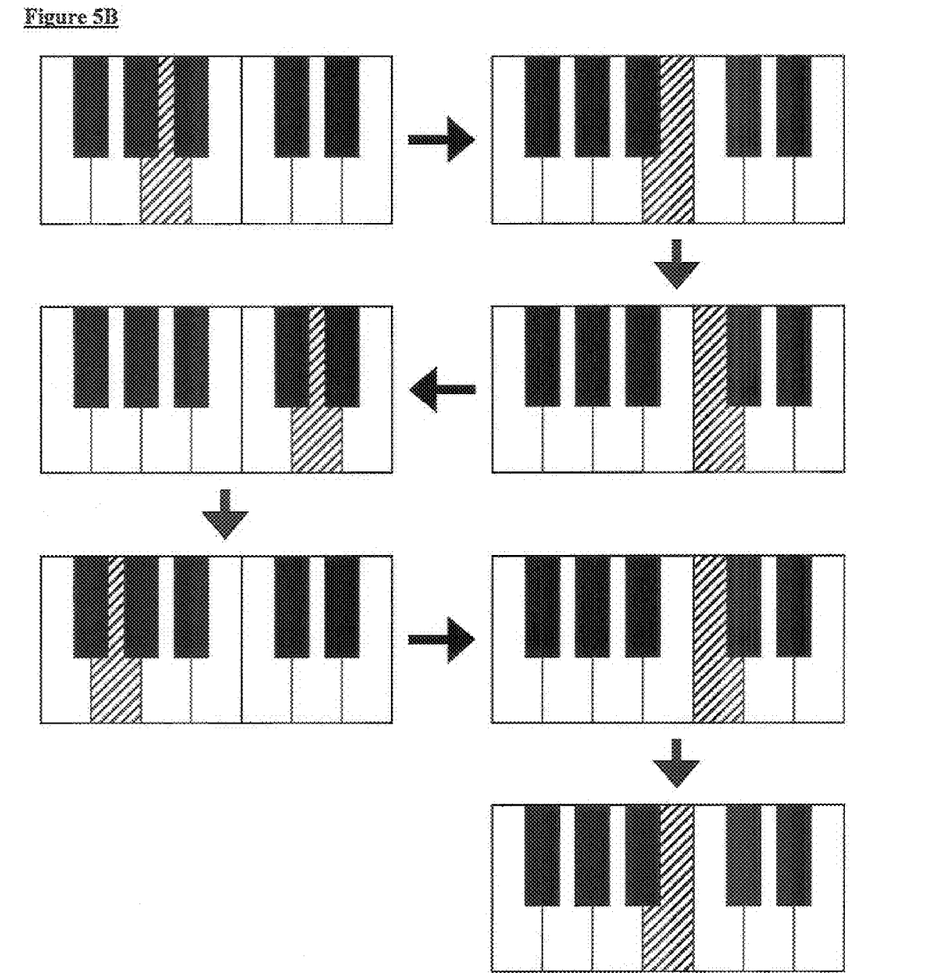
FIG. 5B illustrates which keys on a keyboard are played to effectuate the playing of the sequence of notes illustrated in the music notation system in FIG. 5A. The keys depicted in FIG. 5B are not intended to display an octave, as an octave is measured in connection with the present invention from C (on the bottom) to B (on the top).

First, as depicted in FIG. 5A, individual clusters of notes may be depicted about an arrow 201 to be played in succession, wherein notes on top of the arrow 201 are played in an ascending order (i.e., as one reads the notes from left to right, the successive notes are played, in accordance with the appropriate note, in the next available, higher register than the note before). So, for instance, the "A," "B," "D" progression illustrated as the first three notes on the top of the arrow 201 are played as follows: the "A" played first, then the "B" immediately to the right of the "A" played next, and the first "D" to the right of the "B" (i.e., skipping over "C") played after that. Notes on the bottom of the arrow 201 are played in a descending order (i.e., as one reads the notes from left to right, the successive notes are played, in accordance with the appropriate note, in the next available, lower register than the note before). So, for instance, the "C" and "G" progression illustrated as the first two notes on the bottom of the arrow 201 are played as follows: the first "C" to the left of the "D" (depicted above the arrow, and that was just played) is played first, then the first "G" to the left of the "C" is played (i.e., skipping over "B" and "A"). Applying this logic, the notes depicted in FIG. 5A are played as illustrated in FIG. 5B, in which the keys with diagonal lines depict those that are played in each step. Note, however, that the keys depicted in FIG. 5B are not intended to display an octave, as an octave is measured in connection with the present invention from C (on the bottom) to B (on the top).

Figure 6:
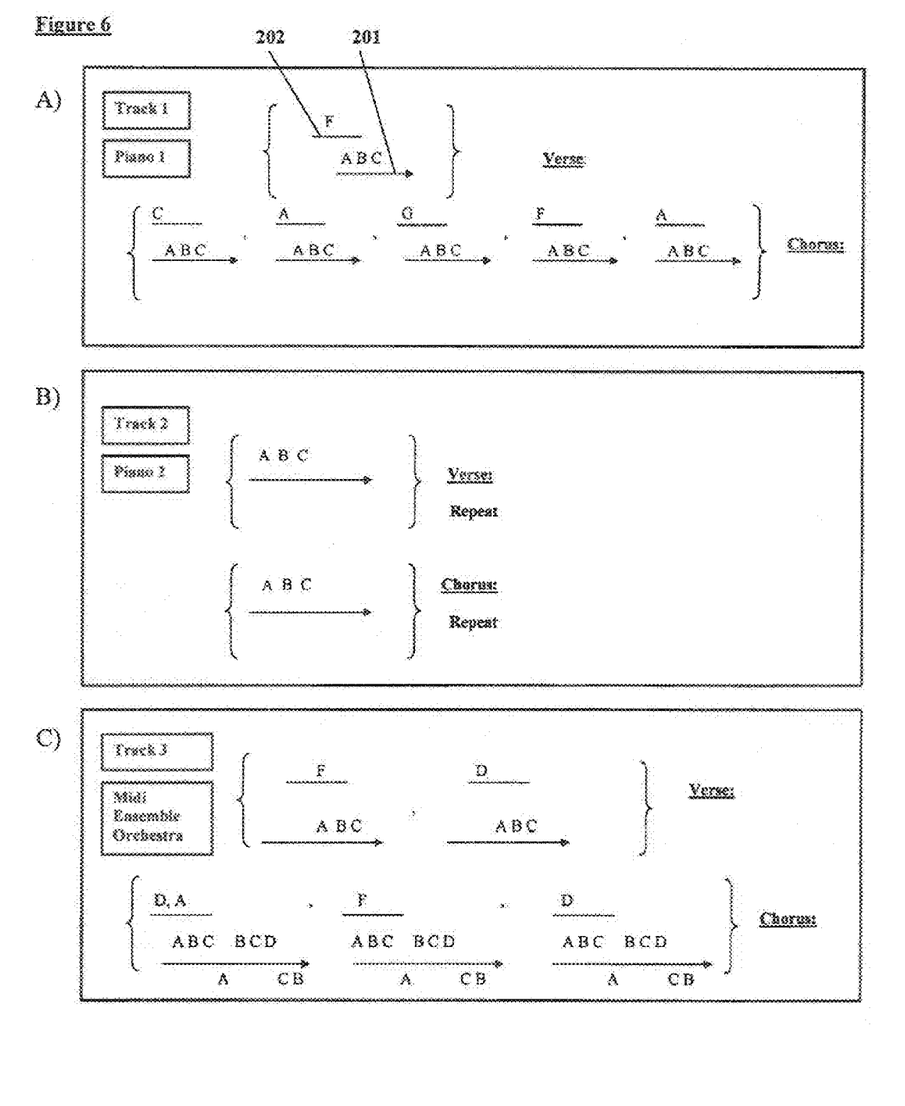
FIGS. 6A, 6B and 6C illustrate a music notation system in connection with an orchestration of music, in accordance with an embodiment of the present invention.
Figure 7:
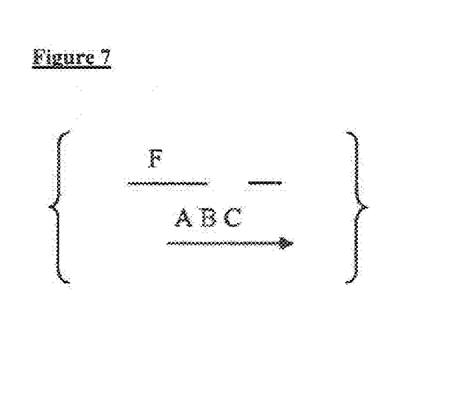
FIG. 7 illustrates a variation on the "verse" depicted in FIG. 6A, in accordance with an embodiment of the present invention.

Second, as depicted in FIG. 6A, arrows 201 are used when individual clusters of notes are to be played in succession, while lines (without arrows) 202 are used when a note, notes or chord are to be played and held for a period of time. In each case, the music is read from left to right, such that overlapping lines and arrows are played simultaneously. For instance, as depicted in FIG. 6A, the "verse" therein is played in the following manner. The note "F" is first played and held. Then, while holding the "F" note, the sequence "A," "B" and "C" is played; however, the "F" note is released when the "B" is played, because the line associated with the "F" ends when one gets to the "B." If, as illustrated in FIG. 7, following a space, the line accompanying the "F" note had resumed after the "C" note, then the "F" note would again be played.

Third, commas used between groupings of lines and/or arrows effectively reset whatever was being played. So, as illustratively depicted in FIG. 6A, the "chorus" is played in the following manner. The note "C" is first played and held. Then, while holding the "C" note, the sequence "A," "B" and "C" is played; however, the first "C" note (i.e., the one associated with the line) is released when the second "C" note (i.e., the one associated with the arrow) is played, because the line associated with the first "C" ends when one gets to the "C" associated with the arrow. Then, the comma appears, which means that all notes are released. Thereafter, the note "A" that is associated with the second line is played and held, and so on.

Figure 8:
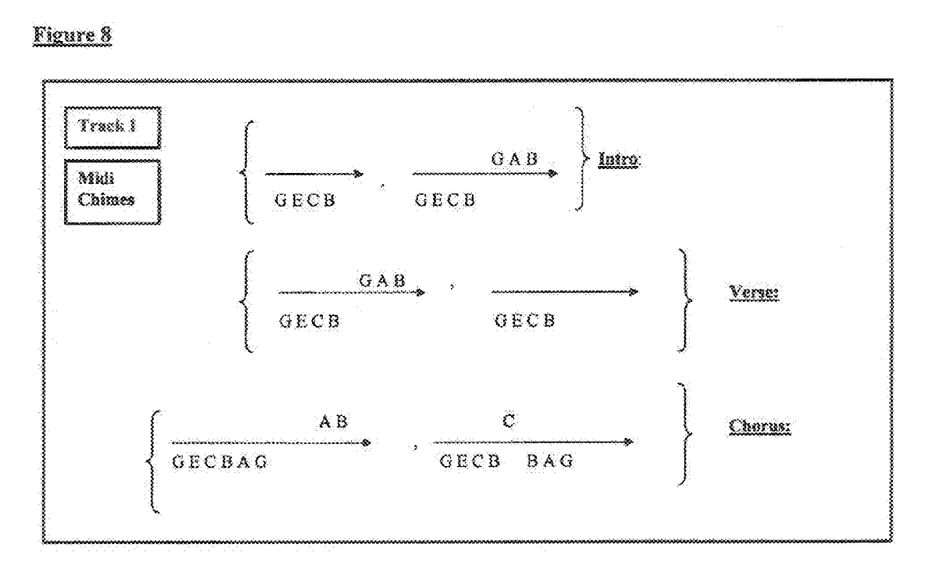
FIG. 8 illustrates a music notation system in connection with an orchestration of music with robust sequences of individual notes, in accordance with an embodiment of the present invention.

Additional complexity can be easily added to the music notation by repeating a musical phrase that is included within brackets (FIG. 6B); by adding further lines, arrows, etc. to create still further instruments or combinations of music (FIG. 6C); or by implementing more robust sequences of individual notes (FIG. 8).

The various music notation systems of the present invention may be incorporated and/or form the basis of a variety of devices, tools and games, as will be readily appreciated by those of skill in the art. Thus, applications that might incorporate some or all of the music notation systems may include, but are in no way limited to, sheet music based entirely on the music notation system of the present invention, annotations to conventional sheet music using the music notation system of the present invention, video games, music instruction tools or publications, MIDI software, music composition software, math game, combinations thereof and a variety of other applications that will be readily identified. In still further embodiments, the music notation system may be used with a computer keyboard or telephone keypad, e.g., for operating MIDI equipment via computer keyboard and musical computer keypad/typewriter musical games.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A music notation system in combination with an instrument or computer system configured to receive instruction from an instrumentalist, the system comprising:
   a display to depict music notation to the instrumentalist for operating the instrument or computer system, the display comprising a horizontal line;
   one or more notes depicted above the horizontal line to be played with a left hand on a keyboard;
   one or more notes depicted below the horizontal line to be played with a right hand on a keyboard; and
   an octave notation to signify a choice of octaves, wherein the one or more notes depicted above the horizontal line to be played with the left hand are in the octave that is two below middle C, and the one or more notes depicted below the horizontal line to be played with the right hand are in the octave that is one below middle C.

2. The music notation system of claim 1, wherein notes are represented by letters, numbers or combinations thereof, and symbols are used in combination with the letters, numbers or combinations thereof to denote sharp and flat notes.

3. The music notation system of claim 1, wherein notes depicted immediately next to one another are to be played as a sequence of notes, and notes depicted with commas therebetween are to be played together as chords.

4. The music notation system of claim 1, comprising a series of individual music segments.

5. The music notation system of claim 4, wherein one or more of the individual music segments in the series of individual music segments is written once but intended to be played more than once.

6. The music notation system of claim 1, comprising octave symbols.

7. The music notation system of claim 1, comprising at least one additional horizontal line to depict corresponding additional octaves.

8. An application comprising the music notation system of claim 1, wherein the application is selected from the group consisting of a video game, a music instruction tool, a MIDI software, a music composition software, a math game, and combinations thereof.

9. The application of claim 8, configured for use with a computer keyboard or telephone keypad.

10. The music notation system of claim 1, wherein the display is a component of a video game or computer apparatus.

* * * * *